(12) United States Patent  
Qian et al.

(10) Patent No.: US 11,145,027 B2  
(45) Date of Patent: Oct. 12, 2021

(54) DYNAMIC TRANSITIONING BETWEEN VISUAL USER INTERFACE ELEMENTS ON A DISPLAY

(71) Applicant: Rightware Oy, Helsinki (FI)

(72) Inventors: Qiang Qian, Helsinki (FI); Olavi Lintumäki, Helsinki (FI); Roope Mäkinen, Helsinki (FI)

(73) Assignee: Rightware Oy, Helsinki (FI)

( * ) Notice: Subject to any disclaimer, the term of this patent is extended or adjusted under 35 U.S.C. 154(b) by 0 days.

(21) Appl. No.: 16/807,205

(22) Filed: Mar. 3, 2020

(65) Prior Publication Data

US 2020/0320666 A1 Oct. 8, 2020

(30) Foreign Application Priority Data

Apr. 2, 2019 (EP) .................................... 19397510

(51) Int. Cl.
  *G06T 3/00* (2006.01)
  *G06T 3/20* (2006.01)
(52) U.S. Cl.
  CPC .............. *G06T 3/0093* (2013.01); *G06T 3/20* (2013.01); *G06T 2200/24* (2013.01)
(58) Field of Classification Search
  CPC combination set(s) only.
  See application file for complete search history.

(56) References Cited

U.S. PATENT DOCUMENTS

| | | | | |
|---|---|---|---|---|
| 6,650,339 | B1 * | 11/2003 | Silva ..................... | G06F 3/0481 345/619 |
| 7,954,951 | B2 * | 6/2011 | Kuno ..................... | B60K 35/00 353/12 |
| 9,916,069 | B2 * | 3/2018 | Williams .............. | G06F 3/0482 |
| 2005/0231512 | A1 * | 10/2005 | Niles ....................... | G06T 13/00 345/473 |
| 2005/0278691 | A1 * | 12/2005 | MacPhee ............... | G06F 9/451 717/104 |

(Continued)

FOREIGN PATENT DOCUMENTS

WO WO2018215906 A1 11/2018

*Primary Examiner* — Motilewa Good Johnson  
(74) *Attorney, Agent, or Firm* — Laine IP Oy

(57) ABSTRACT

According to an example aspect of the present invention, there is provided for an apparatus comprising a User Interface, UI, the method comprising generating or receiving particles, wherein each particle has a first position associated with a first shape, and storing the first positions as current positions, determining a second shape, wherein the second shape forms a first target shape for a first transition from the first shape, and a first target time for the first transition, generating and storing first target positions of the particles associated with the second shape, comparing the first target time to a current time, responsive to the first target time being larger than the current time, determining intermediate positions of the particles, based on the current positions and the first target positions of the particles, wherein the intermediate positions are closer to the target positions than the current positions and updating the user interface by using the intermediate positions of the particles to provide a graphical output on a display, storing the intermediate positions as the current positions.

20 Claims, 4 Drawing Sheets

(56) References Cited

U.S. PATENT DOCUMENTS

| | | | |
|---|---|---|---|
| 2008/0036776 A1* | 2/2008 | Niles | G06F 3/04847 |
| | | | 345/474 |
| 2008/0163086 A1* | 7/2008 | Foxenland | G06F 3/0481 |
| | | | 715/764 |
| 2009/0042619 A1* | 2/2009 | Pierce | G06F 1/1643 |
| | | | 455/566 |
| 2010/0194763 A1* | 8/2010 | Niles | G06T 13/00 |
| | | | 345/474 |
| 2012/0139924 A1* | 6/2012 | Oldengott | G06T 13/00 |
| | | | 345/473 |
| 2012/0313957 A1 | 12/2012 | Fisher et al. | |
| 2015/0301731 A1* | 10/2015 | Okamoto | G06F 3/04842 |
| | | | 715/771 |
| 2019/0057534 A1* | 2/2019 | Henry | G06T 13/00 |
| 2021/0097747 A1* | 4/2021 | Sachter-Zeltzer | G06T 13/80 |

* cited by examiner

DYNAMIC TRANSITIONING BETWEEN VISUAL USER INTERFACE ELEMENTS ON A DISPLAY

FIELD

Embodiments of the present invention relate in general to graphical user interfaces. More specifically, embodiments of the present invention relate to dynamic transitioning between visual user interface elements on a display of a device.

BACKGROUND

Various electronic devices comprise user interfaces for enabling interactions between devices and humans. User interfaces that can interact with at least two senses are generally referred to as Composite User Interfaces, CUIs. A Multimedia User Interface, MUI, then refers to a CUI which comprises sound. In addition, the term Graphical User Interface, GUI, is usually used for CUIs that comprise a touchable UI for enabling control and a visual UI for presenting information on a display. GUIs may be used in different electronic devices, such as computers, mobile phones or vehicular information systems. Other UI types may interact with other senses, such as, smell and taste. Naturally various combinations are possible as well.

In general, a visual UI may have zero or more shapes, possibly comprising visual UI elements, on a display at a time and in case of many applications there is a need to change the number of visual UI elements during the operation to achieve some visual effects or lead the attention of a user. For example, in cars a speedometer may be first represented on a display by a center gauge. At some point during driving it may be desirable to draw the attention of a driver to the speedometer by transitioning the representation of the speedometer to something else, e.g., as two gauges on the sides of the display with different colors.

There may be a need for various transitions between visual UI elements on a display, such as, for example, one-to-many transition, many-to-one transition, one-to-one, zero-to-one or one-to-zero transitions. Regardless of the type of the transition, it is often desirable to perform the transition in a continuous manner on the display, and on top of that control should be enabled during the transition as well. Moreover, the number of transitions may be large in some applications or a lot of steps are required to make the transition smooth visually. Also, a device performing the transition may have limited resources. Hence the transition should be computationally efficient, and avoid excessive use of memory as well.

Some of the existing methods for transitions between visual UI elements are discrete and do not enable continuous transitions, which can be controlled and reconfigured on the fly. And even if some methods may provide some sort of continuous transitions with some control, those consume a lot of computational and memory resources. There is therefore a need for providing an efficient method, apparatus and computer program for dynamic and continuous transitioning between visual UI elements on a display.

SUMMARY OF THE INVENTION

According to some aspects, there is provided the subject-matter of the independent claims. Some embodiments are defined in the dependent claims.

According to a first aspect of the present invention, there is provided a method for an apparatus comprising a User Interface, UI, the method comprising generating or receiving particles, wherein each particle has a first position associated with a first shape, and storing the first positions as current positions, determining a second shape, wherein the second shape forms a first target shape for a first transition from the first shape, and a first target time for the first transition generating and storing first target positions of the particles associated with the second shape, comparing the first target time to a current time, responsive to the first target time being larger than the current time, determining intermediate positions of the particles, based on the current positions and the first target positions of the particles, wherein the intermediate positions are closer to the target positions than the current positions and updating the user interface by using the intermediate positions of the particles to provide a graphical output on a display, storing the intermediate positions as the current positions.

According to the first aspect of the present invention, the method may comprise, in some embodiments, receiving an input to trigger the first transition.

According to the first aspect of the present invention, the method may comprise, in some embodiments, determining the first target time by adding a desired duration for the first transition to the current time.

According to the first aspect of the present invention, the method may comprise, in some embodiments, responsive to the second shape having changed, determining a second target shape and a second target time for a second transition, generating second target positions of the particles associated with the second target shape and storing the second target time as the first target time and the second target positions as the first target positions.

According to the first aspect of the present invention, the method may comprise, in some embodiments, when the target time is less or equal compared to the current time, storing the target positions of the particles as the first positions and initiating a new transition by using the stored first target positions as the first positions for the new transition.

According to the first aspect of the present invention, the method may comprise, in some embodiments, calculating a remaining distance for each particle, by subtracting the target position of each particle from the current position, determining a target velocity for each particle by dividing the remaining distance by a remaining time for each particle, multiplying the target velocity of each particle with the step size and determining the intermediate positions of each particle by adding the result of the multiplication to the current position of each particle.

According to the first aspect of the present invention, the method may comprise, in some embodiments, determining whether the second shape comprises target positions and responsive to the target positions existing, storing the current time as the target time.

According to the first aspect of the present invention, in some embodiments, the graphical output may comprise information concerning a current state of at least one of: a mobile phone, an automobile system, an aircraft system, an industrial machine and a power generation plant.

According to the first aspect of the present invention, the method may comprise, in some embodiments, responsive to the second shape having changed, rendering particles relating to a changed part of the target shape in a different colour.

According to the first aspect of the present invention, the method may comprise, in some embodiments, determining a step size in time for the first transition and starting a counter for the step size and upon expiry of the counter, determining whether the second shape has changed.

According to the first aspect of the present invention, in some embodiments, the first and/or the second shape may comprise one or more UI elements.

According to a second aspect of the present invention, there is provided an apparatus comprising at least one processing core, at least one memory including computer program code, the at least one memory and the computer program code being configured to, with the at least one processing core, cause the apparatus at least to perform the method.

According to a third aspect of the present invention, there is provided an apparatus comprising means for performing the method.

According to a fourth aspect of the present invention, there is provided non-transitory computer readable medium having stored thereon a set of computer readable instructions that, when executed by at least one processor, cause an apparatus to at least perform the method.

According to a fifth aspect of the present invention, there is provided a computer program configured to perform the method.

EMBODIMENTS

Figure 1A:
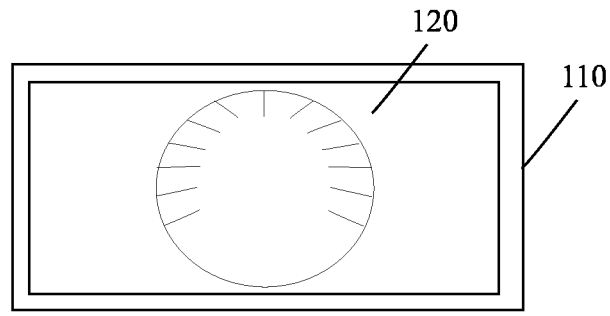
FIG. 1 illustrates an example transition between visual UI elements on a display of a device in accordance with at least some embodiments of the present invention.

Dynamic and continuous transition from one shape, possibly comprising a visual User Interface, UI, element to another shape may be provided efficiently for a graphical user interface, in terms of computational and memory resources, by using particles as an intermediate representation of the shape during the transition. In more detail, particles may be used to represent, e.g., visual UI elements and during the transition particles may be moved from the initial positions to target positions via intermediate positions. A graphical user interface may be updated using the intermediate positions of the particles to provide a visual output on a display. In general, a particle may have a position and other application specific attributes. For example, a particle may have attributes related to physics and appearance, such as, for example, velocity, mass, colour, size, image, etc.

In general, a visual UI element may be referred to as a graphical piece of a user interface that represents some data or action for the user. Transitions between visual UI elements may be seen as a way to change one visual UI element, or a set of them, into one or more other visual UI elements. Intermediate representation may be used during the transition and it may refer to a way to represent a visual UI element in a different way compared to a shape of an initial visual UI element, and a shape of a target visual UI element, which is not restricted to the shape of the initial or the target visual UI elements. Thus, it may be desirable to have an intermediate representation which is flexible enough for a dynamic and continuous transition between shape of an initial visual UI element and the shape of the target visual UI element while also minimizing the computational effort and the use of memory.

Embodiments of the present invention enable configuration, or reconfiguration, of a target shape, such as a target shape of a target visual UI element during the transition, i.e., on the fly. Thus, the target shape, or even topology, of the target shape may be changed during the transition which is not possible with image sequences or other traditional animation methods. In addition, embodiments of the present invention do not require creation of intermediate shapes before the transition, as in case of image sequences. Thus, the amount of memory that is needed for performing the transition is reduced. The reduced need for memory is achieved by avoiding representing and storing all of the intermediate shapes. Moreover, the position of each particle may be updated individually, which is computationally efficient.

FIG. 1 illustrates an example transition between shapes on a display of a device in accordance with at least some embodiments of the present invention. The shapes may be visual UI elements. In the example of FIG. 1 device 110 may comprise display 120. Display 120 may be referred to as a graphical user interface as well. However, in some other embodiments, display 120 may be connected to device 110 via a wireless or wired link, if device 110 does not comprise display 120. In such a case device 110 may comprise, for example, a control device or a display controller for controlling display 120. Device 110 may, in some embodiments be, integrated with display 120 in one physical apparatus. Moreover, display 120 may comprise, for example, a Light Emitting Diode, LED, or Organic LED, OLED, display. Alternatively, display 120 may comprise a Cathode Ray Tube, CRT, or other kind of display.

Device 110 may be configured to control display 120 by providing to display 120 a signal to direct the functioning of display 120. The signal may be in a suitable format that device 110 is arranged to produce, and display 120 is arranged to act on. For example, device 110 may direct display 120 to display status information.

The example transition presented in FIG. 1 comprises four steps 1a-1d, but naturally a transition may, and usually does, comprise much more steps. FIG. 1a demonstrates a first shape before the transition starts, wherein each particle has an initial position, and possibly a state such as colour, representing at least one point of the first shape. For example, in a car the first shape may comprise a first visual UI element. The first visual UI element may represent a speedometer, which has a traditional, full-circle shape (a center gauge). Start of the transition may be referred to as the time when the transition starts to move the first shape, e.g., a first visual UI element towards a target visual UI element.

Figure 1B:
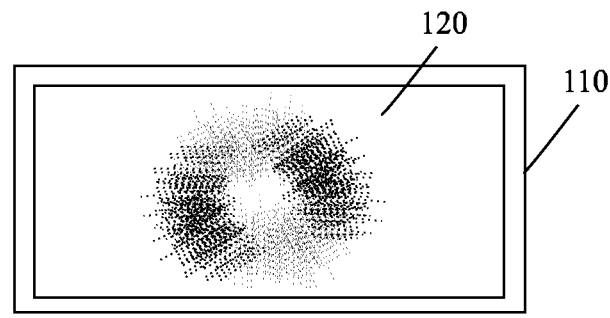

FIG. 1b then represents a first intermediate shape, such as an intermediate visual UI element, wherein each particle has a first intermediate position, and possibly a first intermediate state such as a colour as well. The first intermediate positions, and possibly states, of the particles may be different compared to the first and the target shapes, at least for some particles, but not necessarily for all. FIG. 1b represents merely one example of the first intermediate shape for illustrative purposes. Typically, the first intermediate shape may match more exactly to the first shape of FIG. 1a. The first intermediate positions may be closer to the target positions than the initial positions.

Figure 1C:
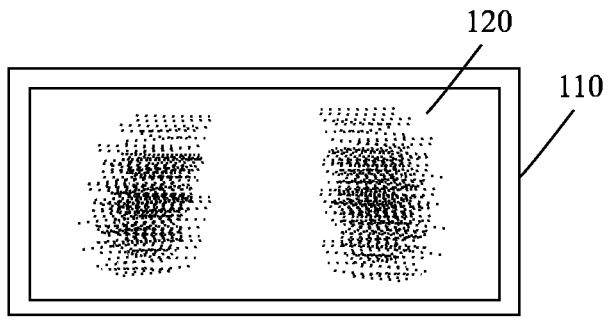

A second intermediate shape, such as a second visual UI element, is shown in FIG. 1c. Again, each particle has a second intermediate position, and possibly a second intermediate state such as a colour as well. The second intermediate positions, and possibly states, of the particles may be different at least for some particles compared to the first intermediate positions, and states if existing, and the first and the target visual UI elements, but not necessarily for all. The second intermediate positions may be closer to the target positions than the first intermediate positions.

Figure 1D:
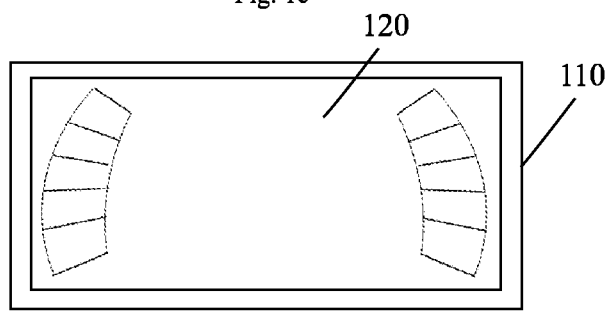

In the example of FIG. 1, FIG. 1d demonstrates the end of the transition, wherein the target shape, such as a target visual UI element, has been reached. For example, in a car the target visual UI element of the example of FIG. 1 may represent a speedometer, which has been divided into two parts (two gauges on the sides of display 120). End of the transition may be referred to as the time when the intermediate representation has completely, or to a defined extent, reached the target shape. That is to say, each particle has reached its target position, and its possible target state as well.

In some embodiments of the present invention, particles may be generated or received to match the shape of the first, initial shape. Then, when a transition starts, particles may be directed towards the target shape via intermediate shapes. Moreover, in some applications, associated UI element graphics may be faded out of the display at this point. Such an operation would visually transform the first shapes into particles, when the first shape still has the original shape.

Embodiments of the present invention enable, for example, transitioning from one shape to another, which may be referred to as one-to-one transition. In addition, transitioning of shapes, e.g., one visual UI element (a center gauge in FIG. 1a) to multiple shapes, e.g., visual UI elements (two gauges on the sides of the display in FIG. 1d) is enabled. This kind of transition may be referred to as one-to-many transition. Also, embodiments of the present invention enable transitioning from multiple shapes to one shape, i.e., many-to-one transition. Embodiments of the present invention also enable transitioning of shapes into a display and out of the display. Such transitions may be referred to as zero-to-one or one-to-zero transitions. Also, in some embodiments, many-to-many transitions are possible.

The use of the particles makes it possible to control how the transition is performed. For example, it is possible to change the target shape during the transition, thereby enabling dynamic transitions. Moreover, particles also enable continuous transitions, which may be needed for communicating changes of focus and/or lead attention in a continuous manner. For instance, changing of a target shape may keep continuity of a transition. That is to say, the transition may be interrupted or changed while retaining the visual continuity.

Some of the existing transitions between visual UI elements, such as, image sequence, are discrete and do not enable continuous transitions, which can be controlled and reconfigured on the fly. On the other hand, particles enable various creative yet flexible and dynamic ways for carrying out the transition.

One solution may be to simply fade the visual UI elements in or out along with simple translation, or interpolating, parameters. Another approach may be to use morph shapes to move mesh vertices between configurations. However, these approaches have severe restrictions for the content and little, if any, control on performing the transition, e.g., reconfiguring the target visual UI element during the transition. Another drawback is that these approaches are not general.

A particle may be an object, which may have a position, physics state (such as velocity/speed) and some state affecting the look, e.g., a colour. Each particle generally represents at least one point of a visual UI element. A particle may be emitted by a particle mesh emitter, which creates particles. Then, a particle buffer may be a structure comprising a collection of particles.

Particle shape emitter may initialize particles into the particle buffer. Different particle shape emitters may have different patterns for generating initial positions and states of particles. For example, a particle mesh emitter may emit particles in a shape defined by a mesh, and also initialize their visual data, i.e., state, to match a colour of a surface. On the other hand, a box emitter may emit inside a box volume.

A particle shape affector may update particles in a particle buffer according to its own rules and parameters. For example, the shape affector may move particles towards a current target shape. It is noted that other affectors may also be active, but those may only have a visual difference. In general, transition of visual UI elements may refer to switching from a set of graphical UI elements on a display to another set of graphical UI elements on the display.

Some embodiments of the present invention may be described in terms of triangle meshes. However, even though triangle meshes are used as an example in the following, embodiments of the present invention may be applied to any kind of shapes in general.

Triangle meshes may be referred to as triangles that are grouped into meshes. Triangle meshes are generally used in computer graphics to enable efficient operation. In the context of computer graphics, a triangle mesh may comprise a set of triangles, wherein the triangles may be connected by their common edges or corners. Triangles are typically in three dimensions and operations may be performed on the vertices at the corners of the triangles. Hence a system may operate on three vertices for every triangle and a large mesh may comprise, for example, eight or more triangles which meet at a single vertex. Consequently, only a fraction of the work is needed for achieving an identical effect by handling those vertices only once.

A particle may be referred to as a point of a triangle mesh and generation of particles may comprise picking a random point inside a random triangle of the mesh for each particle. In any case, it should be noted that even though some embodiments of the present invention are described in terms of triangle meshes, the present invention is applicable in other suitable contexts as well, such as, for example, image based emission/transitioning, any sort of surface/texture data, emission based on bitmap to form an image or text represented as vector graphics or distance field. Hence the present invention is not restricted to triangle meshes.

In some embodiments, a particle mesh emitter, i.e., a particle mesh shape emitter in general, may create particles based on a shape of a mesh, e.g., a visual UI element. For example, the particle mesh emitter may create a certain number of particles with infinite lifetime. Moreover, the particles may be sampled randomly, or with some meaningful pattern, on the surface or placed at vertices of the mesh. In addition, in some embodiments of the present invention, the particle mesh affector, i.e., a particle shape affector in general, may move particles towards a target shape, such as a visual UI element, during a transition time. The transition time may be referred to as the time between the start of the transition and the end of the transition. In some embodiments of the present invention the end of the transition may be referred to as a target time. Moreover, in some embodiments, there may be more than one particle mesh affector. In such a case other particle mesh affectors may affect the particles to produce different transitions. Therefore, in some embodiments two algorithms may be running at the same, wherein the algorithms have different target times and target shapes.

An intermediate representation may be used to implement a smooth transition between shapes, such as visual UI elements, without restricting their original format. For example, 3D particles may be used to generate the intermediate representation based on the shape of a visual UI Element. Moreover, in some embodiments, particles may be faded into a display and out of the display based on a state of the transition, for creating a smooth, continuous transition into particles and back into a shape of another visual UI element. For example, a transition from 3D particles to morph shapes of visual UI elements may comprise two or more intermediate states and a dynamic transition may be generated between the states.

In some embodiments of the present invention, a method may start by creating a particle buffer for each particle emitter. Then, particle buffers of the particle emitters may be updated as follows. For each particle, a triangle may be selected from 3D mesh and then a point on the triangle may be selected as well. After that, each particle may be initialized with properties matching with the point on the mesh.

Upon generating/updating the particle emitters, the method may continue by executing affectors that are associated with the particle emitters. That is to say, each particle emitter is associated with one shape affector, and possibly one or more other affectors associated with the emitter. Execution of an affector may comprise storing a target time based on current time, duration and previous mesh for each frame, if the current mesh changes. Then, for each particle a target position may be acquired by a seeded random sample. After that, distance and available time to get to the target position may be calculated.

The method may continue by determining a desired speed from distance and time by integrating how long it would take to get to target with current speed, which may be used to calculate a corrected target speed/velocity. Moreover, speed/velocity may be corrected toward the corrected target speed/velocity by a weighted average. However, if the remaining time gets to zero, or below zero, each particle may be moved to the target position directly.

As a first example, and with reference to FIG. 1 again, a transition between different gauges may be performed using the following method. First, the method may comprise a setup phase. In the set up phase two meshes may be initialized, wherein a first mesh corresponds to a first shape, such as a visual UI element (initial state, center gauge in FIG. 1*a*) and a second mesh corresponds to a second shape, such as target visual UI elements (set of two side gauges, target state in FIG. 1*b*). Upon initializing the meshes, intermediate particle representation may be prepared for the first mesh. As an optional feature, the particles of the first mesh may be hidden after the preparation.

After that, a particle attractor may be setup to attract the particles to the shape of the first mesh. Moreover, a target time, i.e., end time, for the transition may be set for the attractor. This completes the setup phase. In addition, the second mesh may be hidden at this point, if desired.

Transition between shapes may be initiated by switching the target shape of a mesh attractor. In some embodiments, the original mesh may be faded out from a display while the intermediate representation of the particles may be faded into the display. Then, the transition may be continued by fading out the intermediate representation of the particles and fading in the new mesh. Then the transition phase ends when the particles reach their target positions, and possible states.

As a second example, transition between single shapes, such as single visual UI elements, may performed using the following method. First, the method may comprise a setup phase. In the set up phase, different meshes may be created based on mesh data. One of the created meshes may be chosen as the initial mesh. Upon creating the meshes, intermediate particle representation may be prepared by emitting particles for the initial mesh. As an optional feature, the particles of the initial mesh may be hidden after the preparation. Typically, the setup phase is performed before the particles are rendered.

After that, a particle attractor may be setup to attract the particles to the shape of the first mesh. Moreover, a transition duration may be set for the attractor. Duration of the transition may be calculated by subtracting the target time from the current time. This completes the setup phase. In addition, the second mesh may be hidden at this point, if desired. However, in some embodiments it is not necessary to show the second mesh at all. The transition may be then performed by setting the mesh attractor to be another mesh.

Moreover, as a third example, a method according to embodiments of the invention may be described as follows. A first, plane mesh may be created along with a second mesh, wherein the second mesh is out of view, i.e., not on a display. Then, the first, plane mesh may be used to draw content on the display. After this, a mesh emitter may be set for a second, target mesh, as an out of view mesh. Also, a mesh attractor may be set for the second, target mesh.

Upon setting up the mesh emitter and the mesh attractor for the target mesh, particles may be emitted for particle representation using the mesh emitter and setting up material to use as a texture and uv-cordinate from the second mesh so that they are showing the same image as is shown on the mesh without particles. In some embodiments, the first, plane mesh may be hidden and the particles may be shown.

Moreover, transitioning in may be performed by switching the target mesh of the mesh affector to a plane mesh. Also, the plane mesh may be faded in when the transition ends and the particles may be faded out.

Transitioning out may be performed by switching the first mesh as the out of view mesh. Also, the plane mesh may be faded out when the transition starts. Then, the particles may be faded in. It may not be necessary to try to render the particles when the transition ends, because the particles may be out of view anyway.

Figure 2:
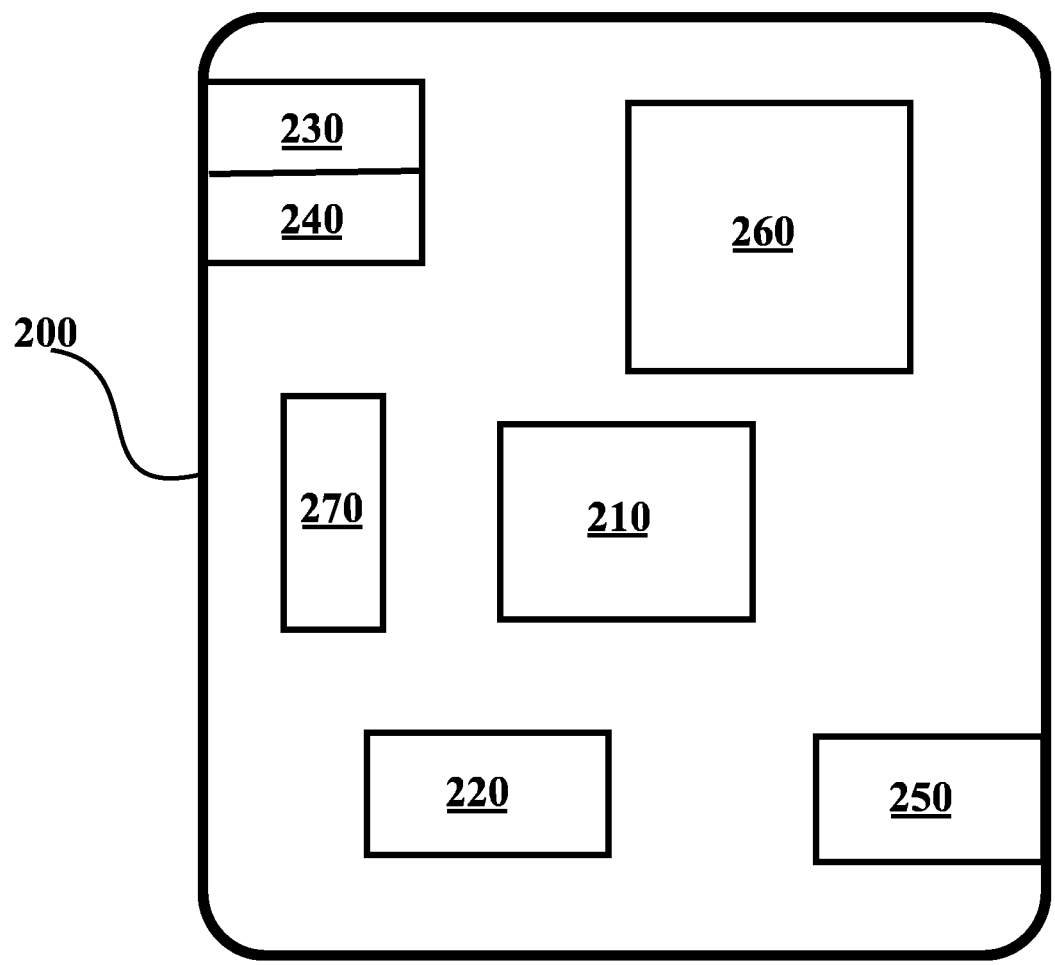
FIG. 2 illustrates an example device capable of supporting at least some embodiments of the present invention.

FIG. 2 illustrates an example device capable of supporting at least some embodiments of the present invention. Illustrated is device 200, which may comprise, for example, device 110 of FIG. 1. Comprised in device 200 is processor 210, which may comprise, for example, a single- or multi-core processor wherein a single-core processor comprises one processing core and a multi-core processor comprises more than one processing core. Processor 210 may comprise a Qualcomm Snapdragon 800 processor, for example. Processor 210 may comprise more than one processor. A processing core may comprise, for example, a Cortex-A8 processing core manufactured by ARM Holdings or a Brisbane processing core produced by Advanced Micro Devices Corporation. Processor 210 may comprise at least one Qualcomm Snapdragon and/or Intel Atom processor. Processor 210 may comprise at least one application-specific integrated circuit, ASIC. Processor 210 may comprise at least one field-programmable gate array, FPGA. Processor 210 may be means for performing method steps in device 200. Processor 210 may be configured, at least in part by computer instructions, to perform actions.

Device 200 may comprise memory 220. Memory 220 may comprise random-access memory and/or permanent memory. Memory 220 may comprise at least one RAM chip. Memory 220 may comprise magnetic, optical, semiconductor and/or holographic memory, for example. Memory 220 may be at least in part accessible to processor 210. Memory 220 may be means for storing information. Memory 220 may comprise computer instructions that processor 210 is configured to execute. Memory 220 may also be implemented in Application-Specific Integrated Circuit, ASIC, or Field-Programmable Gate Array, FPGA. When computer instructions configured to cause processor 210 to perform certain actions are stored in memory 220, and device 200 overall is configured to run under the direction of processor 210 using computer instructions from memory 220, processor 210 and/or its at least one processing core may be considered to be configured to perform said certain actions.

Device 200 may comprise a transmitter 230. Device 200 may comprise a receiver 240. Transmitter 230 and receiver 240 may be configured to transmit and receive, respectively, information in accordance with at least one standard. Transmitter 230 may comprise more than one transmitter. Receiver 240 may comprise more than one receiver. Transmitter 230 and/or receiver 240 may be configured to operate in accordance with Ethernet, parallel bus and/or serial bus standards, for example.

Device 200 may comprise a near-field communication, NFC, transceiver 250. NFC transceiver 250 may support at least one NFC technology, such as NFC, Bluetooth, Wibree or similar technologies.

Device 200 may comprise user interface, UI, 260. UI 260 may comprise at least one of a display, a keyboard, a touch display, a physical controller, an external physical controller, an interface for an external physical controller, a vibrator arranged to signal to a user by causing device 200 to vibrate, a speaker and a microphone. A user may be able to operate device 200 via UI 260, for example to configure transition parameters.

Device 200 may comprise or be arranged to accept a user identity module 270. User identity module 270 may comprise, for example, a subscriber identity module, SIM, card installable in device 200. A user identity module 270 may comprise information identifying a subscription of a user of device 200. A user identity module 270 may comprise cryptographic information usable to verify the identity of a user of device 200 and/or to facilitate encryption of communicated information and billing of the user of device 200 for communication effected via device 200.

Processor 210 may be furnished with a transmitter arranged to output information from processor 210, via electrical leads internal to device 200, to other devices comprised in device 200. Such a transmitter may comprise a serial bus transmitter arranged to, for example, output information via at least one electrical lead to memory 220 for storage therein. Alternatively to a serial bus, the transmitter may comprise a parallel bus transmitter. Likewise processor 210 may comprise a receiver arranged to receive information in processor 210, via electrical leads internal to device 200, from other devices comprised in device 200. Such a receiver may comprise a serial bus receiver arranged to, for example, receive information via at least one electrical lead from receiver 240 for processing in processor 210. Alternatively to a serial bus, the receiver may comprise a parallel bus receiver.

Device 200 may comprise further devices not illustrated in FIG. 2. Processor 210, memory 220, transmitter 230, receiver 240 and/or UI 260 may be interconnected by electrical leads internal to device 200 in a multitude of different ways. For example, each of the aforementioned devices may be separately connected to a master bus internal to device 200, to allow for the devices to exchange information. However, as the skilled person will appreciate, this is only one example and depending on the embodiment various ways of interconnecting at least two of the aforementioned devices may be selected without departing from the scope of the present invention.

Figure 3:
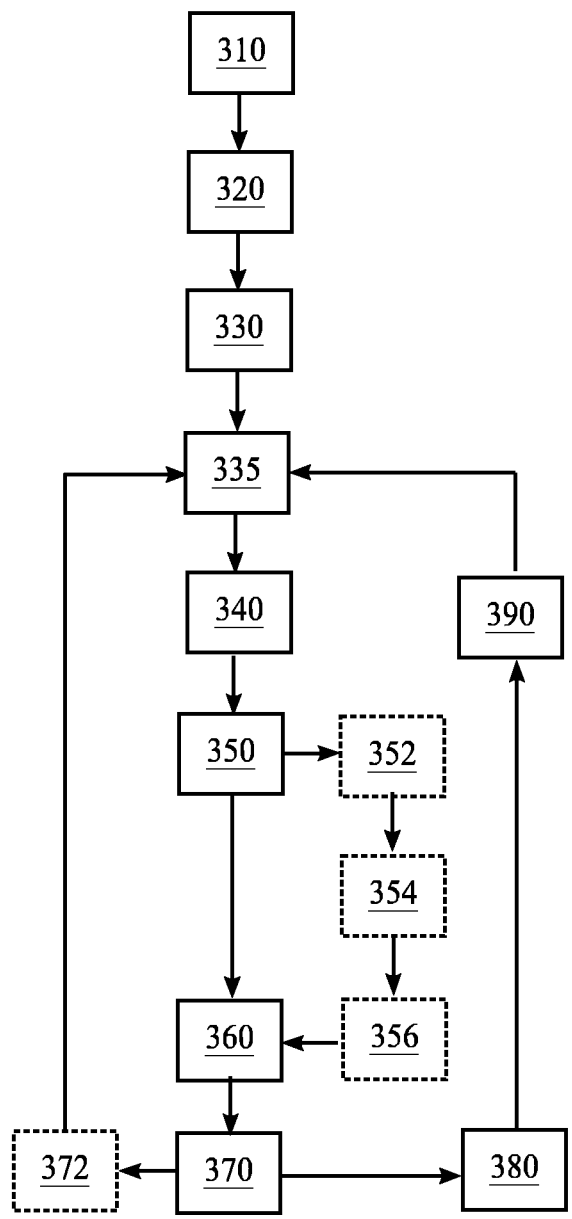
FIG. 3 illustrates a first flow graph of a method in accordance with at least some embodiments of the present invention.

FIG. 3 illustrates a first flow graph of a method in accordance with at least some embodiments of the present invention. The steps of the illustrated method may be performed by device 200 and/or device 110, for example. Also, the steps of the illustrated method may be performed in a control device configured to control the functioning of device 200 and/or device 110, when implanted therein, or remotely using a wireless and/or wired connection. The method may be for a User Interface, UI, for example for a Graphical User Interface, GUI.

The method may begin, at step 310, by generating or receiving particles associated with a first, initial shape, wherein each particle has a first, initial position. The first positions of the particles may be associated with the first shape. However, the first shape may something else than an UI element in some embodiments. For example, the first shape may be given with no shape set, e.g., for a shape affector. For instance, particles may be created later during a transition based on an initial shape, e.g., to create an effect where a second shape emerges from particles being created from the initial shape. Step 310 may also comprise storing the first positions as current positions of the particles, for example, to a first address in a memory, wherein the memory may comprise a buffer for particles (particle buffer).

In some embodiments, there may be no target shape that has positions. In such a case, the current positions may be considered as target positions and the method does not perform any action.

However, in some embodiments, the method may start with any positions and/or other attributes, which may be taken as an initial shape for the particles. It may not be possible to generate more positions or new particles from a shape defined by particle positions. This may be seen as a shape that lack positions.

In some embodiments, new particles may be emitted if the initial shape has positions. The first shape may exist without any particles. Particles emitted during this algorithm may get positions from this initial shape, for instance in an effect, where particles emit from floor to build up the second shape.

In some embodiments, the generated or received particles may be associated with a shape of at least one first visual UI element, ie., the first shape may refer to the shape of the at least one first visual UI element. In such a case, the first positions of the particles may represent at least one point of the at least one first visual UI element.

Generation of the particles may comprise selecting randomly a point on the at least one first visual UI element. Alternatively, or in addition, each particle may have an initial state, such as, for example physical state and/or some state affecting the look, e.g., a certain colour.

The method may also comprise receiving an input to trigger a transition after storing the current positions of the particles. The input may be, e.g., from a user touching the user interface or from a sensor detecting an event. For example, in the context of cars, a sensor may detect a risky situation or an emergency, and consequently trigger the transition to draw the attention of a driver.

Moreover, the method may also comprise, at step 320, determining a shape of a second shape, wherein the second shape may comprise a first target shape for a first transition from the first shape and a target time for the first transition. In some embodiments, the second shape may comprise at least one second visual UI element. The target time for the transition may be determined by adding a desired duration for the transition to a current time.

The method may also comprise, at step 330, generating and storing the target positions of the particles associated with the shape of the second shape, such as the at least one second visual UI element. Again, the particles may be stored to a memory. For example, if a triangle mesh is selected as the target shape, the generation of the target positions of the particles may comprise picking a random point inside a random triangle of the mesh for each particle. That is to say, a target position in the target shape is selected for each particle. Possibly, a first target state may be selected and stored for each particle as well. As an example, the method may comprise rendering the particles in a different colour, e.g., by storing the first target states with different colours compared to the first states.

The method may comprise, at step 335, emitting new particles and generating and storing current positions for the new particles. The positions may be generated based on the initial shape received in step 310.

The method may also comprise, at step 340, determining a step size in time for the transition and starting a counter for the step size. Upon expiry of the counter, the method may also comprise determining whether a target shape has changed, at step 350. Technical effect provided by determining whether a target shape has changed is that the transition may be dynamically controlled by changing the target shape on the fly during the transition.

Responsive to the target shape having changed, the method may then, at step 352, comprise determining a second target shape and a second target time for a second transition. Then, the method may comprise, at step 354, generating second target positions of the particles associated with a second target shape. The method may also comprise, at step 356, storing the second target time as the first target time and the second target positions as the first target positions.

Possibly, a second target state may be selected for each particle as well and stored as the first target state. For example, the method may comprise, responsive to the target shape having changed, rendering the second target states, relating to a changed part of the target shape, in a different colour compared to the first target states. Moreover, the method may also comprise rendering the particles in the different colour upon detecting a change in a velocity of a car.

The second target shape and the second target time may be determined similarly as the first target shape. Also, the second target positions, and possibly second target states, of the particles may be generated and stored similarly as the first target positions to a second address in the memory. Also, the shape of the at least one second visual UI element may be stored to the second address.

In some embodiments, the determination of whether a target shape has changed may comprise checking from a log when the target shape has been amended last time. If it has been amended after the latest update of the UI, then it may be determined that the target shape has changed.

Alternatively, a copy of the shape of the at least one second visual UI element may be stored to a third address in the memory. Consequently, the method may also comprise comparing the shape of the at least one second visual UI element, retrieved from the second address in the memory, to the copy of the shape of the at least one second visual UI element, from the third address in memory. When the shape of the at least one second visual UI element is different than the copy of the shape of the at least one second visual UI element, it may be determined that the target shape has changed. Regardless of how the change of the target shape has been determined, the method may proceed to step 354 responsive to the target shape having changed.

In addition, or alternatively, the determination of whether a target shape has changed may comprise detecting that mesh position data does not match to a stored mesh position data or a pointer to mesh data does not match to the stored mesh data. Also, a function to set the new target shape may be called.

In general, it may be required that the algorithm gets information about the change. The shape may be represented by data instance that can be compared. Two matching instances may be, for example, considered to be different if they are represented by different copies of the same data. The copies may be in different memory addresses to enable comparison.

The definition of changing the target shape may differ in various embodiments. For example, change of a position of the target shape may be included, or excluded, which would change the behavior. If changing the target shape includes changing the position of the target shape, the entire transition may be started again. Thus, the particles would be moved towards the target position. However, if changing the target shape does not include changing the position of the target shape, the target shape may be changed without starting the entire transition from the beginning.

The method may also comprise, at step 360, determining whether the target shape has positions. For example, in some cases there may be no target shape in the memory, if it has been, for example, deleted from the second address. If the target shape has been deleted, then the method steps 352-356 would update the first target as not having positions. Thus, in such a case the determination, at step 350, of whether the target shape has changed may indicate that the target shape has changed, but on top of that it may be necessary to check whether the target still has positions.

Alternatively, or in addition, the method may comprise, at step 360, responsive to the target positions not existing, storing the current time as the target time, and the current positions may be defined as target positions. The target shape may not need to have new positions. Hence, the target shape may exist always when the algorithm runs, but it may be missing target positions. That is to say, this condition ends the transition part of the algorithm so the algorithm would not run anymore, i.e., in case of missing positions the target shape is reached immediately and the transition is completed, but not terminated as there may always be a target shape.

The technical effect provided by determining whether the target shape, i.e., has positions, is also related to dynamic control, because it enables associating the target shape with no specific target during the transition, which effectively ends the transition. For instance, the target shape/positions may be defined to be the current shape/positions, which would end the transition as all the particles would reach the target immediately.

The method may comprise, at step 370, comparing the first target time to a current time. The result of the comparison may be referred to as a remaining time, which may be calculated by subtracting the current time from the first target time. It should be noted that in some embodiments all of the particles may not have the same target time. For example, in some embodiments a target time for new particles may be calculated by summing the time when new particles were generated and the desired duration.

When the first target time is less or equal compared to the current time, the method may proceed and, at step 372, comprise storing the target positions of the particles as the first, initial positions. The decision about the first target time being less or equal compared to the current time may be done per each particle. Thus, the method may proceed for particles for which the target time has not lapsed yet. In general, the transition may be considered as ended when the target time has been reached, or when a first or a last particle has arrived to its target position.

That is to say, the transition may move to the target shape directly if there is no time left, i.e., the remaining time is zero or less. After this the transition may end and, for example, proceed to step 335, and may initiate a new transition. In some embodiments, an idle loop may be created by moving from step 335 to step 340 and, further to step 350. If there is no change at step 350, the algorithm may move to step 372 via steps 360 and 370. From step 372, if there are no positions, the algorithm may move back to step 335.

On the other hand, when the target time is larger than the current time (the remaining time is greater than zero), based on the comparison, the method may comprise, at step 380, determining intermediate positions of the particles, based on current positions and the target positions of the particles, wherein the intermediate positions are closer to the target positions than the current positions, and updating the user interface by using the intermediate positions of the particles to provide a graphical output on a display. The graphical output on the display may comprise information concerning a current state of at least one of: a mobile phone, an automobile system, an aircraft system, a ship, an industrial machine and a power generation plant. For step 380, the method may comprise calculating a remaining distance for each particle by subtracting the target position of each particle from the current position. The method may also comprise determining a target velocity/speed by dividing the remaining distance by the remaining time for each particle.

Thus, in some embodiments the determination of the intermediate positions of each particle may comprise multiplying the target velocity/speed with the step size. In some embodiments weighed averaging of old and desired velocity/speed may be used, instead of overriding a position based on desired velocity, if visually pleasing appearance is desired. Updating the user interface may also comprise visual aspects. For example, the visualization may be either particles only, or switching presentations when the transition starts and ends, or something else.

Upon determination of the intermediate positions, the method may proceed and comprise, at step 390, storing the intermediate positions as the current positions. After that the method may proceed from step 390 to step 335, wherein the intermediate positions may be used as the current positions for continuing the transition towards the target shape.

Figure 4:
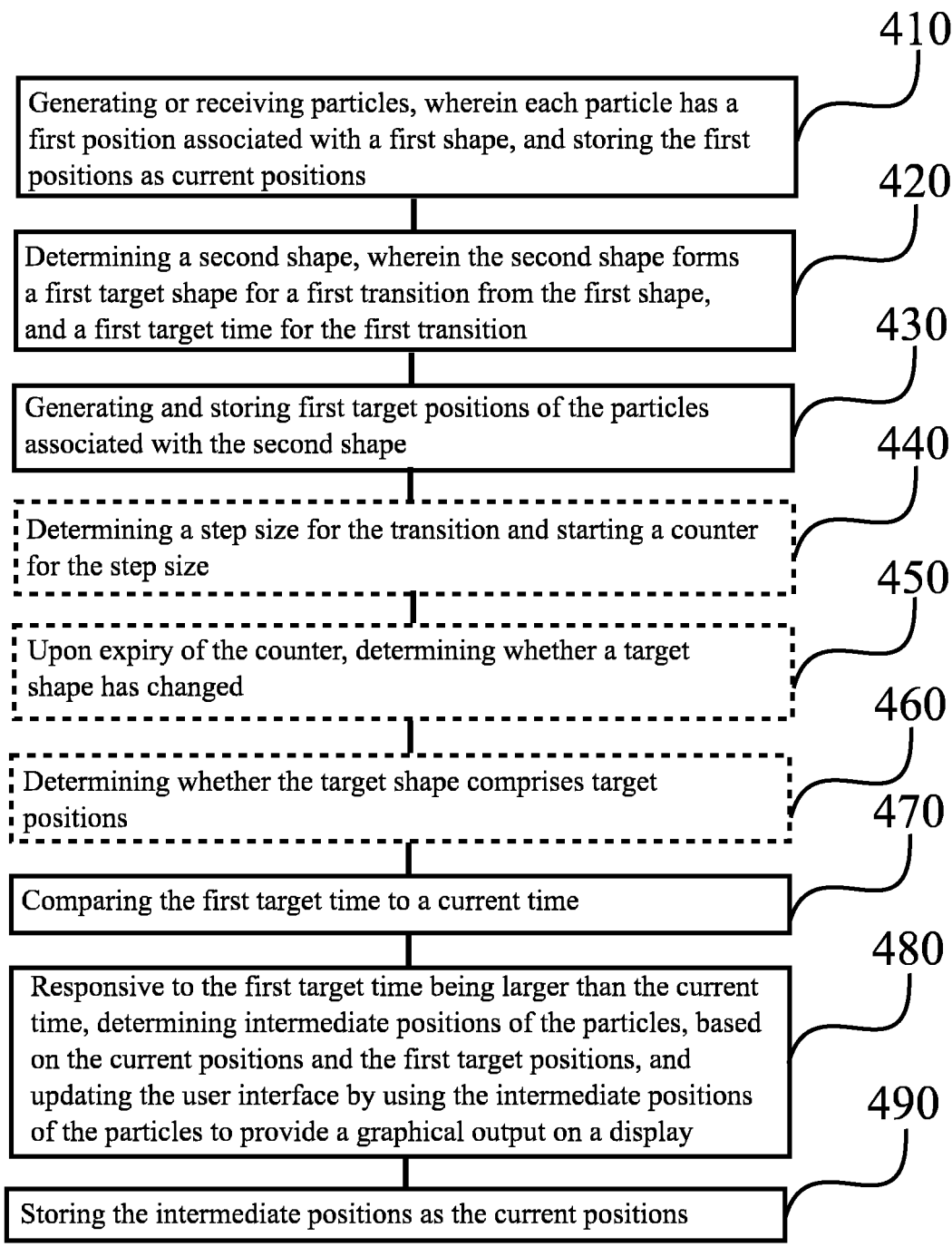
FIG. 4 illustrates a second flow graph of a method in accordance with at least some embodiments of the present invention.

FIG. 4 illustrates a second flow graph of a method in accordance with at least some embodiments of the present invention. The phases of the illustrated method may be performed in device 200 and/or device 110, for example. Also, the phases of the illustrated method may be performed in a control device configured to control the functioning of device 200 and/or device 110, when implanted therein, or remotely using a wireless and/or wired connection. The method may be for a User Interface, UI, for example for a Graphical User Interface, GUI.

With reference to FIG. 3, phases 410-490 of the second flow graph may correspond to steps 310-390 of FIG. 4. Phase 410 may comprise generating or receiving particles, wherein each particle has a first position associated with a first shape. Moreover, phase 420 may comprise a second shape, wherein the second shape forms a first target shape for a first transition from the first shape, and a first target time for the first transition while phase 430 may comprise generating and storing first target positions of the particles associated with the second shape. The second flow graph may also comprise an optional phase for 440 determining a step size for the transition and starting a counter for the step size.

Optional phase 450 may comprise, upon expiry of the counter, determining whether the second shape has changed and optional phase 460 may comprise determining whether the target shape comprises target positions. Then, phase 470 may comprise, comparing (370) the first target time to a current time. The second flow graph may comprise, at phase 480, determining, based on the current positions and the first target positions of the particles, wherein the intermediate positions are closer to the target positions than the current positions, and updating the user interface by using the intermediate positions of the particles to provide a graphical output on a display and at phase 490, storing the intermediate positions as the current positions.

It is to be understood that the embodiments of the invention disclosed are not limited to the particular structures, method steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

In an exemplary embodiment, an apparatus, such as, for example, apparatus 110, may comprise means for carrying out the embodiments described above and any combination thereof.

In an exemplary embodiment, a computer program may be configured to cause a method in accordance with the embodiments described above and any combination thereof. In an exemplary embodiment, a computer program product, embodied on a non-transitory computer readable medium, may be configured to control a processor to perform a method comprising the embodiments described above and any combination thereof.

In an exemplary embodiment, an apparatus, such as, for example, apparatus 110, may comprise at least one processor, and at least one memory including computer program code, wherein the at least one memory and the computer program code are configured to, with the at least one processor, cause the apparatus at least to perform the embodiments described above and any combination thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in graphical user interfaces, for example, in case of vehicular information management.

ACRONYMS LIST

ASIC Application-Specific Integrated Circuit
CRT Cathode Ray Tube
CUI Composite User Interface
FPGA Field-Programmable Gate Array
LED Light Emitting Diode
OLED Organic LED
UI User Interface

REFERENCE SIGNS LIST

| | |
|---|---|
| 110 | Device |
| 120 | Display |
| 200-270 | Structure of the apparatus of FIG. 2 |
| 300-390 | Steps of the method of FIG. 3 |
| 400-490 | Phases of the method of FIG. 4 |

The invention claimed is:

1. A method for an apparatus comprising a User Interface, UI, the method comprising:
generating or receiving particles, wherein each particle has a first position associated with a first shape, and storing the first positions as current positions;
determining a second shape, wherein the second shape forms a first target shape for a first transition from the first shape, and a first target time for the first transition;
generating and storing first target positions of the particles associated with the second shape;
comparing the first target time to a current time;
responsive to the first target time being larger than the current time, determining intermediate positions of the particles, based on the current positions and the first target positions of the particles, wherein the intermediate positions are closer to the target positions than the current positions;
updating the user interface by using the intermediate positions of the particles to provide a graphical output on a display; and
storing the intermediate positions as the current positions.

2. The method according to claim 1, further comprising:
receiving an input to trigger the first transition.

3. The method according to claim 1, further comprising:
determining the first target time by adding a desired duration for the first transition to the current time.

4. The method according to claim 1, further comprising:
responsive to the second shape having changed, determining a second target shape and a second target time for a second transition;
generating second target positions of the particles associated with the second target shape;
storing the second target time as the first target time and the second target positions as the first target positions.

5. The method according to claim 1, further comprising:
when the target time is less or equal compared to the current time, storing the target positions of the particles as the first positions; and
initiating a new transition by using the stored first target positions as the first positions for the new transition.

6. The method according to claim 1, wherein determining the intermediate positions of the particles further comprises:
calculating a remaining distance for each particle, by subtracting the target position of each particle from the current position;
determining a target velocity for each particle by dividing the remaining distance by a remaining time for each particle;
multiplying the target velocity of each particle with the step size; and
determining the intermediate positions of each particle by adding the result of the multiplication to the current position of each particle.

7. The method according to claim 1, further comprising:
determining whether the second shape comprises target positions; and responsive to the target positions existing, storing the current time as the target time.

8. The method according to claim 1, wherein the graphical output comprises information concerning a current state of at least one of: a mobile phone, an automobile system, an aircraft system, an industrial machine and a power generation plant.

9. A non-transitory computer readable medium having stored thereon a set of computer readable instructions that, when executed by at least one processor, cause an apparatus comprising a User Interface, UI:
- generate or receive particles, wherein each particle has a first position associated with a first shape, and storing the first positions as current positions;
- determine a second shape, wherein the second shape forms a first target shape for a first transition from the first shape, and a first target time for the first transition;
- generate and store first target positions of the particles associated with the second shape;
- compare the first target time to a current time;
- responsive to the first target time being larger than the current time, determine intermediate positions of the particles, based on the current positions and the first target positions of the particles, wherein the intermediate positions are closer to the target positions than the current positions;
- update the user interface by using the intermediate positions of the particles to provide a graphical output on a display; and
- store the intermediate positions as the current positions.

10. An apparatus comprising at least one processing core, at least one memory including computer program code, the at least one memory and the computer program code being configured to, with the at least one processing core, cause the apparatus at least to:
- generate or receive particles, wherein each particle has a first position associated with a first shape, and storing the first positions as current positions;
- determine a second shape, wherein the second shape forms a first target shape for a first transition from the first shape, and a first target time for the first transition;
- generate and storing first target positions of the particles associated with the second shape;
- compare the first target time to a current time;
- responsive to the first target time being larger than the current time, determine intermediate positions of the particles, based on the current positions and the first target positions of the particles, wherein the intermediate positions are closer to the target positions than the current positions;
- update the user interface by using the intermediate positions of the particles to provide a graphical output on a display; and
- store the intermediate positions as the current positions.

11. The apparatus according to claim 10, wherein the at least one memory and the computer program code are further configured to, with the at least one processing core, cause the apparatus at least to perform:
receive an input to trigger the first transition.

12. The apparatus according to claim 10, wherein the at least one memory and the computer program code are further configured to, with the at least one processing core, cause the apparatus at least to perform:
determine the first target time by adding a desired duration for the first transition to the current time.

13. The apparatus according to claim 10, wherein the at least one memory and the computer program code are further configured to, with the at least one processing core, cause the apparatus at least to perform:
- responsive to the second shape having changed, determine a second target shape and a second target time for a second transition;
- generate second target positions of the particles associated with the second target shape; and
- store the second target time as the first target time and the second target positions as the first target positions.

14. The apparatus according to claim 10, wherein the at least one memory and the computer program code are further configured to, with the at least one processing core, cause the apparatus at least to perform:
- when the target time is less or equal compared to the current time, store the target positions of the particles as the first positions; and
- initiate a new transition by using the stored first target positions as the first positions for the new transition.

15. The apparatus according to claim 10, wherein the at least one memory and the computer program code are further configured to, with the at least one processing core, cause the apparatus at least to perform:
- calculate a remaining distance for each particle, by subtracting the target position of each particle from the current position;
- determine a target velocity for each particle by dividing the remaining distance by a remaining time for each particle;
- multiply the target velocity of each particle with the step size; and
- determine the intermediate positions of each particle by adding the result of the multiplication to the current position of each particle.

16. The apparatus according to claim 10, wherein the at least one memory and the computer program code are further configured to, with the at least one processing core, cause the apparatus at least to perform:
- determine whether the second shape comprises target positions; and
- responsive to the target positions existing, store the current time as the target time.

17. The apparatus according to claim 10, wherein the graphical output comprises information concerning a current state of at least one of: a mobile phone, an automobile system, an aircraft system, an industrial machine and a power generation plant.

18. The apparatus according to claim 10, wherein the at least one memory and the computer program code are further configured to, with the at least one processing core, cause the apparatus at least to perform:
responsive to the second shape having changed, render particles relating to a changed part of the target shape in a different colour.

19. The apparatus according to claim 10, wherein the at least one memory and the computer program code are further configured to, with the at least one processing core, cause the apparatus at least to perform:
- determine a step size in time for the first transition and starting a counter for the step size; and
- upon expiry of the counter, determine whether the second shape has changed.

20. The apparatus according to claim 10, wherein the first and/or the second shape comprises one or more UI elements.

* * * * *